INVENTOR.
HENRY W. PARKER
BY
ATTORNEY

July 10, 1956      H. W. PARKER      2,754,492
METHOD AND APPARATUS FOR PRECISION ECHO RANGING
Filed April 13, 1953      3 Sheets-Sheet 2
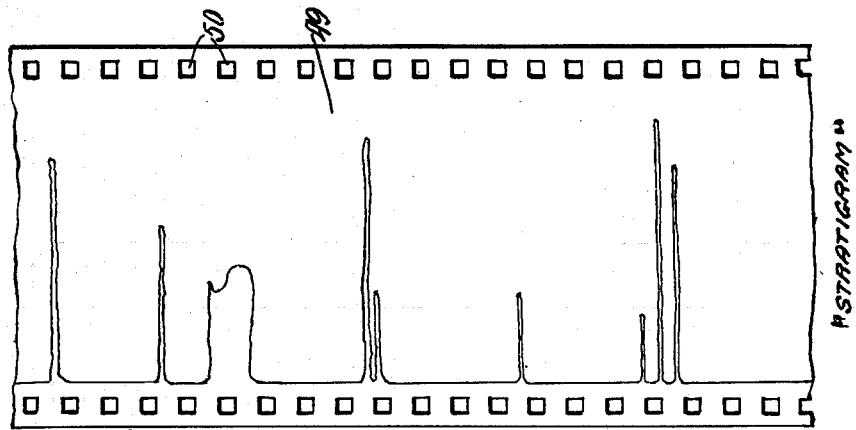
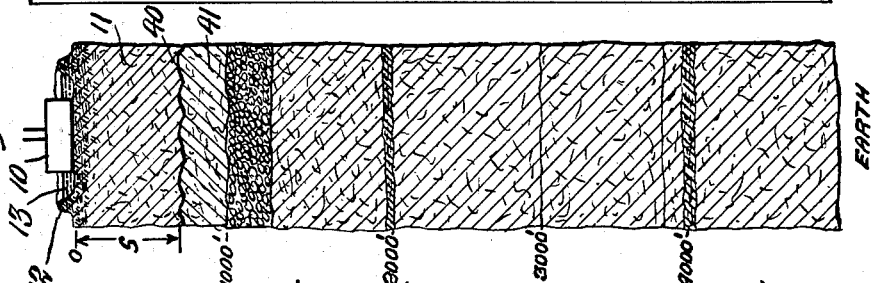
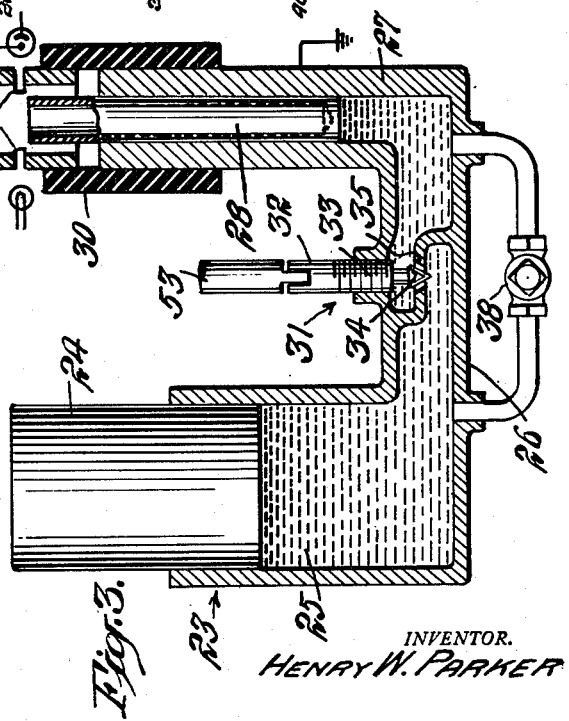
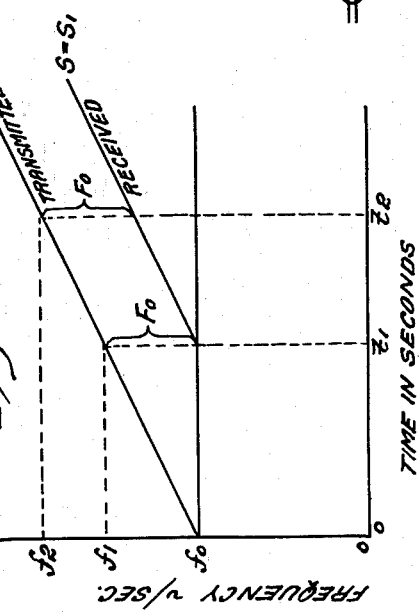
INVENTOR.
HENRY W. PARKER
BY
ATTORNEY

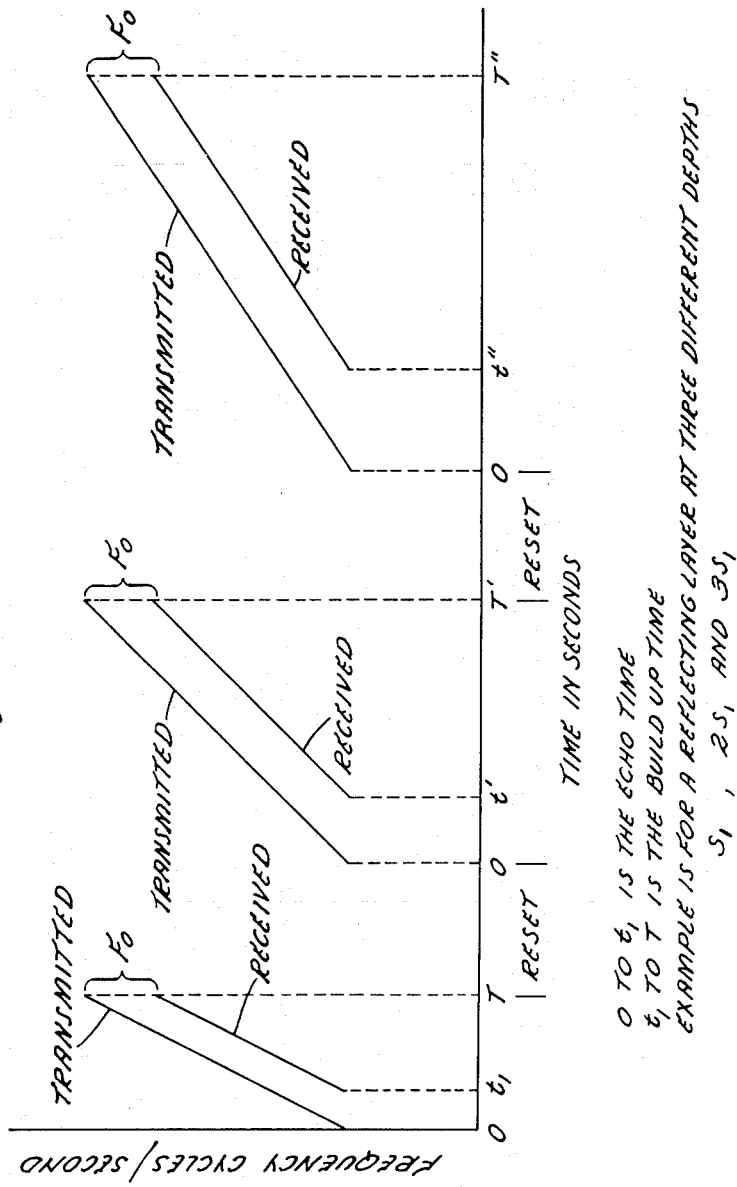

United States Patent Office 2,754,492
Patented July 10, 1956

2,754,492

METHOD AND APPARATUS FOR PRECISION ECHO RANGING

Henry W. Parker, Flushing, N. Y.

Application April 13, 1953, Serial No. 348,353

14 Claims. (Cl. 340—15)

The present invention relates to echo ranging and more particularly to methods and to apparatus of this character utilizing acoustic waves and arranged for the precise determination of the respective depths of various geological formations in the earth.

Although the specific embodiment of the invention, which is herein shown and described and which has been termed the "Stratigraph," is particularly suited to the accurate location of geological strata in the earth, the invention may also be applied for navigational purposes, as in acoustic sounding, and may be readily applied to use electromagnetic waves instead of acoustic waves.

Among the objects of the invention is the provision of an echo ranging system comprising a signal generator of which the output frequency varies linearly throughout a range of frequencies, the time rate of frequency change being maintained constant with a high degree of precision.

Another object of the invention is to provide a system of this character which uses a single sharply tuned fixed frequency selective device in the receiving circuit, the system being so arranged as to provide ample time for the response of the sharply tuned frequency selective device.

A further object of the invention is to provide an echo ranging system of this character in which a progressive strip chart record is obtained indicating the echo magnitude, if any, reflected from progressively changing depths in the earth.

Another object of the invention is the provision of automatic control means which progressively tests for echoes at different depths and advances a strip chart as the depth changes so that a graphic record of the magnitude of the echo is placed on the chart at a position corresponding, at least approximately, to the depth in the earth from which the echo was received.

A further object of the invention is the provision of a hydraulically operated variable capacitor which forms a part of an oscillator circuit, the capacitor being arranged with respect to the oscillator to produce a precisely linear variation in frequency with respect to time.

Still another object of the invention is the provision of control means for recycling the hydraulically actuated variable capacitor so that tests at progressively varying depths may proceed automatically, the time rate of change of the capacitor being altered in the course of each recycling.

A further object of the invention is the provision of precision timing means and frequency standardization means for precision investigation at depths which appear from the strip chart record to be of special interest, an electronically controlled chronograph being started and stopped at predetermined oscillator frequencies whose values correspond to two definite positions of the movable element of the variable capacitor, photoelectric means controlled by the position of the movable capacitor element being provided for starting and stopping the chronograph.

A feature of the invention resides in the use of aqueous coupling in the form of a puddle of water between the earth and the electroacoustic transducing means by which the acoustic waves are propagated and the reflected echo waves are received.

Other and further objects will become apparent upon reading the following the specification together with the accompanying drawings.

The drawings accompanying and forming part of this specification illustrate certain present practical embodiments of the invention. Structure and method, however, may be modified and changed as regards the immediate illustration, all within the true intent and broad scope of the invention as hereinafter defined and claimed.

Fig. 1 in the drawings is a schematic diagram illustrating an embodiment of the invention;

Fig. 2 is a graph showing the time rate of change of the frequency of transmitted and received signals when using the apparatus illustrated in Fig. 1;

Fig. 3 is a diagrammatic representation of a hydraulically actuated variable capacitor for obtaining a precisely linear change in frequency with respect to time;

Fig. 4 is a vertical sectional view illustrating different subsoil strata whose location may be accurately determined by the apparatus shown in Fig. 1;

Fig. 5 is a section of a strip chart graphical record produced by the apparatus of Fig. 1 and showing the relative locations of the subsoil strata of Fig. 4 drawn on a scale such that they are positioned opposite the various corresponding subsoil strata as shown in Fig. 4;

Fig. 6 is a graph showing other transmitted and received waves with slopes different from those shown in Fig. 2 and showing transmitted waves of different slopes for different distances.

Figure 1:
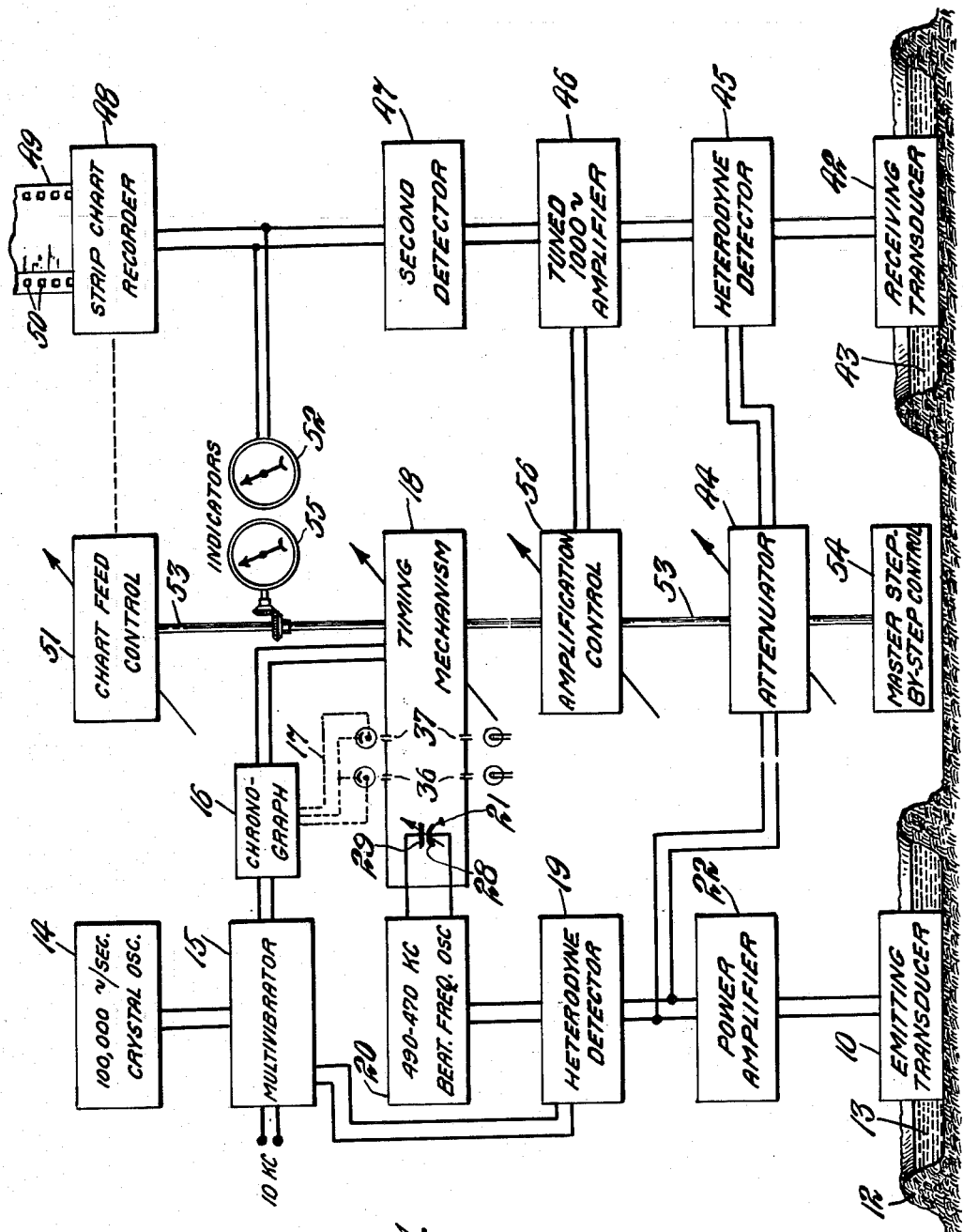

Referring to Fig. 1, a transducer 10 is shown arranged to propagate acoustic waves downwardly into the earth 11. To improve the acoustic coupling between the emitting acoustic transducer 10 and the earth 11, the transducer 10 is shown surrounded by an annular dam 12 partially filled with water to provide a puddle 13. The transducer 10 rests on the earth 11 approximately in the center of the puddle of water 13 and is preferably of an acoustic output impedance matched to the impedance of water. The puddle 13 will, of course, insure that the earth immediately beneath and adjacent to the transducer 10 will be suitably moistened and thus have improved transmission characteristics for the acoustic waves emitted by the transducer 10. Moreover, the water of the puddle 13 will provide aqueous coupling with the earth 11 by filling all interstices between the bottom surface of the transducer 10 and the upper surface of the earth 11 and will thereby match the acoustic output impedance of transducer 10 for efficient wave propagation.

In the illustrative apparatus shown in Fig. 1, the transducer 10 is energized at a power level of about 100 watts and at a frequency which is varied with precisely controlled time linearity over a frequency range starting, for example, with a predetermined initial frequency of 10 kc. and ending at a predetermined terminal frequency of 30 kc.

A 100 kc. crystal oscillator 14 is used as a frequency standard and its output is connected to a frequency-dividing multivibrator 15. The multivibrator 15 may be of any conventional type, and provides an output of 10 kc. for use as a reference standard in checking the initial frequency of the emitted signal. A second output of 1 kc. is provided for driving an electronic chronograph 16. Chronograph 16 may conveniently take the form of an electronic decade counter which may be started and stopped by a control circuit 17 extending to timing mechanism 18 hereinafter more fully described.

The multivibrator 15 also produces a 500 kc. output which is applied to a heterodyne detector 19. An oscillator 20, which advantageously may be of the beat frequency type, applies a frequency which varies with precisely controlled time linearity from an initial frequency of 490 kc. to a final frequency of 470 kc., the frequency variation being controlled by a variable capacitor 21, later to be described. The beat frequency between the fixed standard 500 kc. from the multivibrator 15 and the linearly varying 490–470 kc. oscillator 20 is taken from the heterodyne detector 19 as an output frequency which changes with precisely controlled time linearity from an initial frequency of 10 kc. to a final or terminal frequency of 30 kc. The beat frequency is amplified by a power amplifier 22 and is applied to the emitting transducer 10 which propagates an acoustic wave having an initial frequency of 10 kc. and a final frequency of 30 kc. Accordingly, the transducer 10 must respond efficiently over the 10–30 kc. frequency range. To avoid resonance effects, a plurality of individual transducers each having a different resonant frequency may be combined in order that the transducer 10 may have the desired flat response characteristics over the 10–30 kc. frequency band.

In order to practice the present invention it is essential that the frequency of the oscillator 20 vary precisely linearly during an adjustable time interval which, in the specific example illustrated, may be as short as two seconds or as long as thirty-two seconds. During this interval the output frequency of oscillator 20 changes from its initial frequency of 490 kc. to its final frequency of 470 kc.

Fig. 3 shows a variable capacitor which may be used for this purpose. The capacitor is hydraulically operated and comprises an hydraulic accumulator 23 illustratively shown as comprising a plunger 24 whose weight maintains constant pressure upon a fluid 25 such as oil, for example, confined within the accumulator 23. Accumulator 23 is designed in known manner so that the pressure change accompanying the withdrawal of fluid therefrom is negligible. The accumulator 23 communicates through a duct 26 with a cylinder 27 provided with a vertically movable hollow piston 28. A tubular electrically conductive sleeve 29 is disposed above piston 28 coaxially therewith and is secured in spaced relationship with respect thereto by a further sleeve 30 formed of suitable insulating material. Piston 28 constitutes the grounded electrode of variable capacitor 21 and the electrically conductive tubular sleeve 29 constitutes the ungrounded electrode of capacitor 21.

The internal diameter of sleeve 29 need not be constant and may vary progressively throughout its length so that the frequency-plunger position characteristics of the variable capacitor 21 will be precisely linear or may depart from such linearity in a predetermined precisely controlled manner, such that the output of the variable frequency oscillator 20 will be precisely linear throughout its 490–470 kc. range. Inasmuch as the ultimate object is to obtain precise linearity between time and frequency, the configuration of the internal surface of the conductive sleeve 29 may be further modified to compensate for any non-uniformity in the velocity of upward movement of plunger 28.

The velocity of movement of plunger 28 is controlled by a needle valve 31 having a valve stem 32 threadedly disposed in the wall of the duct 26, at 33, and provided at its lower end with a pointed needle 34 cooperating with a valve seat 35. The rate of flow of fluid from accumulator 23 to cylinder 27 may thus be controlled by changing the angular position of shaft 32, as more fully hereinafter described.

A photoelectric control slit 36 is shown in Fig. 3 which, when eclipsed by the upwardly moving grounded piston 28, initiates the chronograph to start counting. At the instant of the eclipse of the light beam by the piston, the piston is in the frequency-plunger position of the capacitor corresponding to a beat frequency output of the beat frequency oscillator of precisely 490 kc. A further photoelectric control slit 37 is shown disposed upwardly above slit 36 in spaced relationship with respect thereto, for eclipse by the upwardly moving grounded piston 28 at a position in the path of its upward travel which the plunger 28 will reach when it will have reduced the output frequency of variable oscillator 20 to 470 kc.

The two control photoelectric slits 36, 37 are used for starting and stopping the electric chronograph 16 to obtain an accurate measurement of the time of travel of plunger 28 from the lower slit 36 to the upper slit 37 with a precision of 0.001 second or a greater precision, if desired. Such increased precision may be obtained by using a narrower light slit and a higher chronograph driving frequency, 0.002″ slit instead of 0.005″ and 10 kc. instead of 1 kc., for example. The photoelectrically triggered chronograph 16 fulfills the need for a high degree of accuracy of time interval determination required for high resolution Stratigraph instrumentation.

At the end of its upward travel, the circuit completed by engagement between the bumper contact 39 and the upper end of plunger 28 may advantageously be used to operate recycling mechanism of known construction (not shown) for drawing the plunger 24 of accumulator 23 upwardly, whereby the fluid 25 in cylinder 27 may return to accumulator 23 through a check valve 38 by-passing the needle valve 31, such upward movement being continued until the light beam at the lower slit 36 is no longer intercepted by the plunger 28, thus preparing the plunger 28 for another upward stroke at a slower velocity.

Referring to Fig. 4, the propagated acoustic wave travels downwardly into the earth 11 until it encounters an irregularity in the acoustic impedance of the medium through which it is traveling. Such an irregularity will be caused by the upper face 40 of an earth stratum 41 such as clay or rock, for example. This impedance irregularity produces a partially reflected wave which travels upwardly back to the surface of the earth 11 where it is received by a receiving transducer 42 (Fig. 1).

The receiving transducer 42 is acoustically coupled to the earth 11 by another puddle of water 43, preferably situated at an appropriate distance from the first puddle 13. Receiving transducer 42 may consist, for example, of a plurality of individual button microphones each covering an individual frequency range and electrically connected together to provide a flat response characteristic over the 10–30 kc. range.

The received signal is combined with an adjustably controlled portion of the instant transmitted signal derived from a variable attenuator 44 connected to the input of the power amplifier 22, this combination being effected by a heterodyne detector 45. The beat frequency produced by the heterodyne detector 45 is applied to a sharply tuned amplifier 46 highly selectively responsive only to an extremely narrow band of frequencies, the amplifier being peaked at a center frequency of 1 kc. The sharply selected 1 kc. component of the beat frequency between the transmitted and reflected acoustic waves is rectified in a second detector 47 and applied to the measuring input terminals of a strip chart recorder 48 which records the magnitude of the 1 kc. component on a strip chart 49. Chart 49 is provided with lateral perforations 50 for engagement with conventional chart feeding mechanism (not shown) controlled by a chart feed control device designated 51. A visual indicator 52 is provided for observation of the magnitude of the received signal and is connected to the output of the second detector 47 along with the recorder 48.

The entire apparatus is coordinated with the depth from which the reflected wave is received, by mechanism which includes a master control shaft 53 coupled to the needle valve stem 32. The master control shaft 53 is connected to the chart feed control device 51 to move the strip chart 49 so that its position with respect to the recording element of the recorder 48 will be longitudinally in correspondence with the depth from which the 1 kc. beat frequency component is received. The angular position of shaft 53 may be progressively advanced by a master step-by-step control unit 54 which is actuated by a circuit responsive to the upper bumper control contact 39 at the end of each upward stroke of piston 28. This master control unit may include a suitable device of known type for resetting piston 28 downwardly preparatory to its next upward stroke and may also include means for turning the master control shaft 53 through a predetermined small angular displacement to advance the strip chart 44 through a corresponding longitudinal distance. An angular position indicator 55 is shown connected to master control shaft 53 to provide an approximate visual indication of the depth from which the reflected echo wave is received. For precision investigation, the time interval is measured by the chronograph 16 and the initial and final frequency of oscillator 20 are accurately checked so that errors arising from changes in the viscosity of the fluid 25 or other factors, may be eliminated.

Amplification control 56 is connected to the tuned 1 kc. amplifier 46 and is mechanically coupled to the master control shaft 53. The variable attenuator 44 and the amplification control 56, both mechanically coupled to master control shaft 53 for successive angular displacements therewith, are so arranged that the amplification of tuned amplifier 46 increases as the echo signal becomes weaker with increasing depth of the earth from which it is reflected. The variable attenuator 44 applies a progressively reduced portion of the instant transmitted signal to the heterodyne detector 45 for obtaining a better operation thereof as the echo signal becomes weaker.

It will thus be seen that for each successive different position of angular displacement of the master control shaft 53, there will be a different valve opening which is determined by needle 34 and valve seat 35 in the frequency-sweep capacitor apparatus of Fig. 5. In each different position of master control shaft 53 the beat frequency oscillator 20 will therefore sweep with precise linearity through its frequency range, causing the emitting transducer 10 to propagate an acoustic wave having an initial frequency of 10 kc. and a final frequency of 30 kc. However, the time rate of linear sweep through this 10-30 kc. range will be different for each position of master control shaft 53 and each time rate of sweep corresponds to a specific depth in the earth for the origination of the reflected wave. The reflected wave must always produce a precisely fixed 1000 cycle beat note, regardless of the depth from which the reflected wave originates, in order to be amplified by the sharply selective tuned amplifier 46 and be measured by the indicator 52. Successive frequency sweeps thus scan or survey the earth for impedance irregularities at successively changing depths, each depth being determined by its own individual time rate of linear frequency sweep which produces the fixed 1000 cycle note.

The operation of the apparatus may be explained as follows:

The celerity or velocity of propagation of an acoustic wave in a solid medium depends on shear stresses in a complicated sense, differing from propagation in a liquid which cannot support a shear.

For water—

(Eq. 1) $\rho k c^2 = 1$ $\begin{cases} c = \text{celerity ft./sec.} \\ k = \text{compressibility } 2.32 \times 10^{-8} \frac{\text{cu. ft.}}{\text{ft. lb.}} \\ \rho = \text{mass density } 1.94 \frac{\text{slugs}}{\text{cu. ft.}} \end{cases}$ Substitution of these values for $\rho$ and $k$ in Eq. 1 gives 4720 ft./sec., which agrees well with the observed value of 4728 ft./sec.

For steel—

(Eq. 2) $c_1 = 2\sqrt{\frac{G}{\rho}\left[\frac{Y}{3G-Y}+4\right]}$ where
$G$ = modulus of rigidity, $11.66 \times 10^6$ lb./in.$^2$
$Y$ = Young's modulus, $28.00 \times 10^6$ lb./in.$^2$
$\rho$ = mass density, $8.62 \times 10^{-3}$ slugs/in.$^3$
$c_1$ = longitudinal celerity, in./sec.

Substitution of these values in Eq. 2 gives $2.08 \times 10^5$ in./sec., which is 17,300 ft./sec. and agrees well with the observed value of 16,820 ft./sec. for steel.

The purpose of the above examples is to show how the celerity depends on the characteristics of the medium. This celerity is important in the determination of the acoustic coefficient of reflection at the interface between two rock/rock or two rock/liquid layers.

In a medium providing good acoustic conductivity and low attenuation of the signal, the sonic impedance can be expressed by the inertance, which is the celerity times the mass density.

(Eq. 3) $Z = \rho c$

The coefficient of acoustic reflection at the boundary of two media of different acoustic impedances $Z_1$ and $Z_2$, is given by the expression (Eq. 4)

$\dfrac{\xi r}{\xi i} = \dfrac{1 - Z_1/Z_2}{1 + Z_1/Z_2}$ $\begin{cases} \xi r \text{ is the reflected amplitude} \\ \xi i \text{ is the incident amplitude} \\ Z \text{ is the sonic impedance of a layer} \end{cases}$ The following table is illustrative of specific values:

| $Z_1/Z_2$ | 1 | 0.9 | 0.8 | 0.7 | 0.6 | 0.5 | 0.4 | 0.3 | 0.2 | 0.1 |
|---|---|---|---|---|---|---|---|---|---|---|
| $\xi r/\xi i$ | 0 | 0.05 | 0.11 | 0.17 | 0.25 | 0.33 | 0.43 | 0.54 | 0.66 | 0.91 |

There is no reflection for interfaces having equal impedances. For a 1:2 impedance mis-match, the coefficient of reflection is about one-third.

The wave-length of the acoustic wave in the medium is given by the expression (Eq. 5) $\lambda = c/f$ $\begin{cases} \lambda \text{ is the wave-length} \\ f \text{ is the frequency} \\ c \text{ is the celerity} \end{cases}$

*Example.*—For slate rock $c$ is 14,800 ft./sec. If $f$ is 10,000 cycles per second, then the wave-length is 1.48 ft.

In Fig. 4 a signal leaves the emitting transducer 10 and travels a distance $s$ to surface 40 by which it is reflected back to where it arrives $t = 2s/c$ second later.

*Example.*—For a value of $s$ corresponding to a depth of 5000 ft. and assuming a value of $c$ of 14,800 ft./sec. as for slate rock, the total travel time of the acoustic wave $2s/c$ is 0.675 seconds delay.

Usually the energy absorption of the wave energy in the medium is small compared with loss by inherent spreading or scattering of a spherical wave. By reason of this spreading, the wave energy diminishes in direct ratio to the square of the distance.

This basic fact requires provision for the received signal to be amplified in proportion to the square of the delay time or total distance traveled, so that the received signal will not be masked by being small in amplitude for echoes from great depths.

The interface between layers of rock is usually quite even for sedimentary rock. This evenness allows specular (mirror-like) reflection of the sonic wave.

If the wave-length of the sonic wave is large compared with the diameter of stones in an underground gravel bed, then there will be a small amount of diffused scattering. If the wave-length is small, then the scattering will be large in this gravel bed case. Fortunately, big stone gravel layers are infrequent in sedimentary rock formations.

It should be remembered that sonic reflection is partly specular and partly diffused reflection at best.

Figs. 2 and 6 show how the transmitted and received signals vary with time and distance.

The elementary form of the transmitter of the Stratigraph is a generator which emits a sonic wave into the earth having a constant rise of frequency in a transmitting period which lasts for several seconds.

(Eq. 6) $\quad f = f_0(1 + \beta t)$ where $f$ is the instantaneous frequency at any time
$f_0$ is the initial frequency at $t = 0$
$\beta$ is the linear slope $df/dt \times 1/f_0$

*Example.*—Let the initial frequency $f_0$ be 10,000 cycles per second; $\beta$ be one and $t$ be 0.1 sec.; then $f$ is 11,000 cycles per second at $t = 0.1$ sec. later.

To determine the beat between the instant transmitted and received echo signals $(f_t - f_r)$ substitution of values in Equation 6 produces the following result:

(Eq. 7) $\quad (f_t - f_r) = f_0(1 + \beta t_1) - f_0 = f_0 \beta t_1$ where $t_1$ is the echo time from some depth $s_1$.

But since $f_0$ was the frequency at zero time, the echo will have a frequency $f_0$ when it arrives $t_1$ sec. later; and it can be made to beat with the instant frequency $f_1$ when it arrives. In this case $f_r$ is the same as $f_0$ and $f_t$ the same as $f_1$ (Fig. 2). The beat is $(f_1 - f_0)$. This beat frequency is the constant frequency difference $F_0$ in the diagram of Fig. 2. Substituting $F_0$ for the beat frequency $(f_t - f_r)$ in Equation 7 yields $$F_0 = f_0 \beta t_1$$

But $t_1 = 2s_1/c$ therefore $F_0 = \dfrac{f_0 \beta 2 S_1}{C}$ and hence (Eq. 8) $\quad S_1 = \left[\dfrac{F_0 c}{2 f_0}\right] \cdot \dfrac{1}{\beta}$ where $s_1$ is the depth in the earth
$F_0$ is a fixed beat frequency
$f_0$ is the initial frequency
$c$ is the celerity
$\beta$ is the linear and constant slope $df/dt \times 1/f_0$ This equation is basic to understanding of the invention.

*Example.*—Let $F_0$ be 1000 cy./sec.; $c$ for slate rock be 14,800 ft./sec.; $f_0$ be 10,000 cy./sec. and $\beta$ be 1.

Then $s_1$ is 740 ft. below the surface of the earth.

It is a prime requisite that the emitted frequency vary in exactly linear relationship with time. Otherwise the constant frequency $F_0$ and the particular value of $\beta$ would no longer be indicative of a certain depth.

In the operation of the present invention, and particularly in the illustrated embodiment thereof adapted for geophysical measurements, the object of the measurements is the determination with precision of the depth of various geological strata. In making such measurements, it is desirable to eliminate, insofar as possible, the effects of earth noises which have a random distribution throughout the entire frequency spectrum including a 10–30 kc. frequency band used for the emitted acoustic wave.

In the course of its linear variation from its initial frequency of 10 kc. to its final frequency of 30 kc., the discrete rock interfaces of the various subsoil strata produce superimposed signals in the nature of acoustic spectral lines, analogous to the spectral lines visible optically, in the case of light, when using a spectrometer. Preferably the sharply tuned amplifier 46 comprises a high Q resonator having a signal acceptance band from 990 to 1010 cy./sec. The initial cost of the apparatus is greatly reduced since the resonant circuit is responsive only to a single fixed predetermined frequency.

*The period T*

T represents the time required for the generated frequency to change from 10,000 cycles to 30,000 cycles at an exactly constant rate. T is related to $\beta$ in the following way:

(Eq. 9) $\quad T = \dfrac{f_{max} - f_0}{f_0 \beta}$

The choice of T is dictated by consideration of the depth of exploration as determined by the sensitivity and resolving power of the apparatus.

By substituting the value of $\beta$ in Eq. 9 into Eq. 8 we get a useful depth equation in terms of T—

(Eq. 10) $\quad S = \left[\dfrac{F_0 c}{2(f_{max} - f_0)}\right] T$ where

S is the depth in feet
T is the sweep time in seconds
$F_0$ is a fixed beat frequency (1000 cy./sec.)
$c$ is the celerity in the rock ft./sec.
$f_{max}$ is the terminal frequency of the linear sweep cy./sec.
$f_0$ is the initial frequency of the linear sweep cy./sec.

For high resolution purposes it is preferred to vary T and keep $(f_{max} - f_0)$ constant, for a constant band width between 30,000 and 10,000 cycles per second, although T may be kept constant and $(f_{max} - f_0)$ varied or both may be varied, if desired.

For example, assuming that in Equation 10 T is 2.00 seconds; $F_0$ is 1000 cycles per second; $c$ is 14,800 ft./sec. in slate rock and that the $f_{max}$ is 30,000 cy./sec. and $f_0$ is 10,000 cy./sec., then the value of S is 740 ft. If this setting were tried and no signal received back, then it would mean that the rock at 740 ft. was homogeneous.

The next step would be to try T equal to 2.10 seconds and if a signal is received back it would be known that at a level of 777 ft. there is an interface between two different kinds of rock.

While probing the 740 ft. level with the highly selective receiver, the 777 ft. level would be sending back an echo frequency which when beat with the instant outgoing transmitter frequency would give a beat of 1040 cycles per second which would be rejected by the high Q receiver.

From this example it should be appreciated that we depend on exact linear change of frequency not deviating more than a few cycles from its assigned course of constant frequency change, and on a high Q selective circuit to reject 1040 cy./sec. Under ideal conditions a Q of 50 will allow resolution of interface levels to within about 10 in 740 ft.

*The "build-up" time*

The build-up time is $T - t_1$. It is the time available for excitation of a high Q circuit. The longer this time is, the higher is the permissible Q allowed, and hence the greater is the resolving power. $t_1$ is the echo time and T is the sweep time.

This long build-up time permitted by the "Stratigraph" idea allows high Q resonant receivers to be used for high resolution of rock structures deep in the earth.

*The increase of voltage amplification with depth*

Because the echo diminishes with the depth squared it is necessary to increase the receiver amplification as the depth squared; but since the depth $s$ is proportional to T (see Eq. 10), the voltage amplification ($A_v$) is proportional to $T^2$.

Table I is given as an example, in which $c$ is 14,800 ft./sec.; $F_0$ is 1000 cycles per second; $f_{max}$ is 30,000 cycles per second and $f_0$ is 10,000 cycles per second.

TABLE I

| | | | | | |
|---|---|---|---|---|---|
| T sec. sweep time | 2 | 4 | 8 | 16 | 32 |
| $s$ ft. depth | 740 | 1,480 | 2,960 | 5,920 | 11,840 |
| $t_b$ "build up" time | 1.9 | 3.8 | 7.6 | 15.2 | 30.4 |
| $A_v/A_v$ (740') | 1 | 4 | 16 | 64 | 256 |

In the above table, the term $A_v/A_v$ (740') means that the voltage amplification in the receiver is referred to that value required for work at the 740' level in slate rock.

For convenience in equipping the Stratigraph for use in already existing deep holes, the emitting transducer 10 and the receiving transducer 42 can be mounted in casings which can be lowered into a deep hole using electric cables to connect them to the Stratigraph apparatus on the earth's surface. The new datum is now the bottom of the hole in the "Stratigram" record and although the discrete acoustic spectral lines are more complex because of the position of the new datum, the operational procedure is quite the same as when the surface of the earth is the datum.

What is claimed is:

1. The method of echo ranging which comprises the steps of propagating a wave toward a reflecting surface, said wave having a predetermined initial frequency; varying the frequency of said wave precisely linearly during a measured time interval from said initial frequency to a predetermined final frequency; receiving the wave reflected from such surface; deriving from said propagated and received waves a third wave having a frequency which is continuously equal to the frequency difference between said propagated and received waves at every instant; sharply selecting from said third wave a component, if any, having a fixed predetermined frequency; and varying the time rate of said precisely linear frequency variation to obtain a definite measurable magnitude for said selected component of said third wave, whereby the magnitude of said time rate of said linear frequency variation which accompanies the obtaining of said definite magnitude for said component is inversely proportional to the distance traveled by said propagated wave in producing said reflected wave at the time when said definite magnitude for said component is obtained.

2. The method according to claim 1, in which the frequency interval between said initial frequency and said final frequency is maintained at a constant value, and wherein said measured time interval which accompanies the obtaining of said definite magnitude for said selected component is varied, whereby the magnitude of said time interval is directly proportional to said distance traveled by said propagated wave.

3. The method according to claim 1, wherein said time interval is maintained at a constant value, and wherein the interval between said initial frequency and said final frequency is varied, whereby said distance traveled by said propagated wave is inversely proportional to the difference between said initial and said final frequencies through which the frequency of said propagated wave is varied when said definite magnitude for said selected component is obtained.

4. The method of echo ranging which comprises the steps of propagating an acoustic wave of substantially sinusoidal wave shape in an acoustically conductive medium toward a zone of discontinuity of the acoustic impedance of said medium, said wave having a predetermined initial frequency; varying the frequency of said wave precisely linearly during a measured time interval to a predetermined final frequency; receiving the acoustic wave reflected from said zone of impedance discontinuity; deriving from said propagated and received waves a third wave having a frequency which is continuously equal to the frequency difference between said propagated and received waves at every instant; sharply selecting from said third wave a component, if any, having a fixed predetermined frequency; and varying the time rate of said precisely linear frequency variation to obtain a definite measurable magnitude for said selected component of said third wave, whereby the magnitude of said time rate of said linear frequency variation which accompanies the obtaining of said definite magnitude for said component is inversely proportional to the distance traveled by said propagated wave in producing said reflected wave at the time when said definite magnitude for said component is obtained.

5. The method according to claim 4, in which the frequency interval between said initial frequency and said final frequency is maintained at a constant value, and wherein said measured time interval is varied, whereby the magnitude of said time interval which accompanies the obtaining of said definite magnitude for said selected component is directly proportional to said distance traveled by said propagated wave.

6. The method according to claim 4, wherein said time interval is maintained at a constant value, and wherein the interval between said initial frequency and said final frequency is varied, whereby said distance traveled by said propagated wave is inversely proportional to the difference between said initial and said final frequencies through which the frequency of said propagated wave is varied when said definite magnitude for said selected component is obtained.

7. Echo ranging apparatus of the class described, comprising variable frequency wave generating means; means for varying said frequency with precise linearity from a predetermined initial frequency to a predetermined final frequency over an adjustable measured time interval; wave propagating means energized by said wave generating means; wave receiving means for receiving a reflected wave produced by said wave propagated by said propagating means; heterodyning means for deriving the beat frequency between said oscillator frequency and the frequency of said received wave; sharply selective means connected to said heterodyning means for selecting a component of a predetermined fixed frequency from said beat frequency; and indicating means responsive to the magnitude of said component, whereby the time rate of change of said precise linear variation is inversely proportional to the distance traveled by said generated wave in producing said reflected wave in generating a component of any particular indicated magnitude.

8. Echo ranging apparatus according to claim 7, in which said wave propagating means comprises electroacoustic transducing means disposed for producing an acoustic wave in the earth and in which said reflected wave is produced by an impedance discontinuity accompanying changes in the nature of subsoil strata of the earth, said receiving means being acoustically coupled to the earth for receiving said reflected wave.

9. Echo ranging apparatus according to claim 8, in which said transducing means is surrounded by a puddle of water and has an output impedance matched to the acoustic impedance of said water and wherein said receiving means is surrounded by a further puddle of water, whereby said transducing and receiving means are aqueously acoustically coupled to the earth.

10. Echo ranging apparatus according to claim 7, further comprising recycling means for causing said wave generating means to sweep repeatedly through a fixed frequency range beginning with said initial frequency and ending with said final frequency.

11. Echo ranging apparatus according to claim 10, further comprising time interval varying means controlled by said recycling means for progressively and incrementally varying said time interval prior to the beginning of each sweep through said frequency range.

12. Echo ranging apparatus according to claim 10, further comprising recording means controlled by said recycling means.

13. Echo ranging apparatus according to claim 10, further comprising time interval varying means controlled by said recycling means for progressively and incrementally varying said time interval prior to the beginning of each sweep through said frequency range; and distance indicating means controlled by said recycling means along with said time interval varying means for indicating the travel distance of said generated wave in producing said reflected wave.

14. Echo ranging apparatus according to claim 10, further comprising a movable recording medium; recording means controlled by said first-named indicating means for impressing a record on said recording medium in accordance with said magnitude of said component; time interval varying means controlled by said recycling means for progressively and incrementally varying said time interval prior to the beginning of each sweep through said frequency range; and displacement means controlled by said recycling means along with said time interval varying means for moving said recording medium in accordance with the magnitude of said time interval.

References Cited in the file of this patent

UNITED STATES PATENTS

| | | |
|---|---|---|
| 2,092,762 | Kroger | Sept. 14, 1937 |
| 2,247,662 | Newhouse | July 1, 1941 |
| 2,275,735 | Cloud | Mar. 10, 1942 |
| 2,355,826 | Scharpe | Aug. 15, 1944 |
| 2,390,187 | Sharpe | Dec. 4, 1945 |
| 2,413,116 | Shook et al. | Dec. 24, 1946 |
| 2,418,538 | Yetter | Apr. 8, 1947 |
| 2,420,672 | Maillet | May 20, 1947 |
| 2,474,918 | Slaymaker | July 5, 1949 |
| 2,490,968 | Keizer et al. | Dec. 13, 1949 |
| 2,521,130 | Scherbatskoy | Sept. 5, 1950 |
| 2,634,398 | Piety | Apr. 7, 1953 |
| 2,710,959 | Pierce | June 14, 1955 |